United States Patent
Holland et al.

(10) Patent No.: US 10,094,242 B2
(45) Date of Patent: Oct. 9, 2018

(54) REPAIR OR REMANUFACTURE OF LINER PANELS FOR A GAS TURBINE ENGINE

(71) Applicant: United Technologies Corporation, Hartford, CT (US)

(72) Inventors: Brian K. Holland, Lansing, MI (US); Michael A. Morden, Holt, MI (US); Brandon A. Gates, DeWitt, MI (US); William Bogue, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 653 days.

(21) Appl. No.: 14/628,263

(22) Filed: Feb. 22, 2015

(65) Prior Publication Data

US 2015/0240661 A1 Aug. 27, 2015

Related U.S. Application Data

(60) Provisional application No. 61/944,372, filed on Feb. 25, 2014.

(51) Int. Cl.

| B29C 73/04 | (2006.01) |
|---|---|
| F01D 25/24 | (2006.01) |
| F02C 9/00 | (2006.01) |
| B23P 6/00 | (2006.01) |
| F01D 25/00 | (2006.01) |
| B29C 73/26 | (2006.01) |

(52) U.S. Cl.
CPC ............ *F01D 25/24* (2013.01); *B23P 6/005* (2013.01); *B29C 73/04* (2013.01); *F01D 25/005* (2013.01); *F02C 9/00* (2013.01); *B29C 73/26* (2013.01); *Y02T 50/672* (2013.01); *Y10T 29/49318* (2015.01)

(58) Field of Classification Search
CPC ............. F02C 9/00; B23P 6/005; B29C 73/04
See application file for complete search history.

(56) References Cited

U.S. PATENT DOCUMENTS

| 2,000,199 A | * | 5/1935 | Stanley | H01M 2/06 |
|---|---|---|---|---|
| | | | | 29/623.2 |
| 4,826,106 A | | 5/1989 | Anderson | |
| 5,076,049 A | | 12/1991 | Von Benken et al. | |
| 5,275,529 A | * | 1/1994 | Langenbrunner | F02C 7/045 |
| | | | | 244/132 |
| 5,336,044 A | * | 8/1994 | Forrester | F01D 21/045 |
| | | | | 415/196 |
| 5,433,653 A | * | 7/1995 | Friess | B24C 1/003 |
| | | | | 451/100 |

(Continued)

OTHER PUBLICATIONS

EP search report for EP15156490 dated Jul. 28, 2015.

*Primary Examiner* — Christopher Verdier
*Assistant Examiner* — Kayla McCaffrey
(74) *Attorney, Agent, or Firm* — O'Shea Getz P.C.

(57) ABSTRACT

A method of remanufacturing a liner panel for a gas turbine engine includes removing a bushing from a damaged component; and molding the bushing with a material charge. A liner panel for a gas turbine engine includes a forward fan exit case liner panel with a donor bushing from a damaged forward fan exit case liner panel. A liner panel for a gas turbine engine includes a forward fan exit case liner panel molded from a material charge that includes a multiple of layers. At least one of the multiple of layer includes a discontinuity.

8 Claims, 9 Drawing Sheets

(56) References Cited

U.S. PATENT DOCUMENTS

| | | | |
|---|---|---|---|
| 5,484,120 A * | 1/1996 | Blakeley | B64D 41/007 244/54 |
| 7,093,439 B2 | 8/2006 | Pacheco-Tougas et al. | |
| 7,255,528 B2 | 8/2007 | Stretton | |
| 7,640,961 B2 * | 1/2010 | Stubner | B29C 33/485 156/173 |
| 7,857,026 B2 * | 12/2010 | Stadtlander | B29C 65/544 156/382 |
| 7,866,939 B2 | 1/2011 | Harper et al. | |
| 7,914,251 B2 | 3/2011 | Pool et al. | |
| 7,967,108 B2 | 6/2011 | Harper | |
| 8,186,934 B2 | 5/2012 | Humphries | |
| 8,231,328 B2 | 7/2012 | Reed | |
| 8,256,223 B2 | 9/2012 | Dierberger et al. | |
| 8,464,831 B2 | 6/2013 | Burak et al. | |
| 8,572,986 B2 | 11/2013 | Roberts et al. | |
| 8,578,697 B2 | 11/2013 | Harper et al. | |
| 2009/0230213 A1 | 9/2009 | Harris | |

* cited by examiner

REPAIR OR REMANUFACTURE OF LINER PANELS FOR A GAS TURBINE ENGINE

CROSS-REFERENCE TO RELATED APPLICATION

This application claims priority to U.S. Provisional Patent Application Ser. No. 61/944,372 filed Feb. 25, 2014, which is hereby incorporated herein by reference in its entirety.

BACKGROUND

This disclosure relates generally to composite structures and, more particularly, to repair, remanufacture, or original manufacture thereof.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases. An engine case structure formed of multiple cases or modules support the rotational hardware. The engine cases may be manufactured of metallic materials and are subject to a harsh environment as the products of combustion at high temperature pass therethrough.

Composite structures such as liner panels are typically mounted within the case structure. The panels may include molded structures with metal bushings for replacement of the panel as, although effective, over time, the panel may be prone to wear from vibration. Oftentimes the wear occurs around the bushings that remain serviceable.

SUMMARY

A method of remanufacturing a liner panel for a gas turbine engine, according to one disclosed non-limiting embodiment of the present disclosure, includes removing a bushing from a damaged component and molding the bushing with a material charge.

In a further embodiment of the present disclosure, the method includes removing the bushing from the damaged component by abrasive blasting.

In a further embodiment of any of the foregoing embodiments of the present disclosure, the abrasive blasting is performed using plastic media with a pressure up to about 70 psi.

In a further embodiment of any of the foregoing embodiments of the present disclosure, the bushing is a metallic bushing.

In a further embodiment of any of the foregoing embodiments of the present disclosure, the material charge includes a multiple of layers. At least one of the multiple of layer includes a discontinuity.

In a further embodiment of any of the foregoing embodiments of the present disclosure, a main body of one of the multiple of layers defines a width WM and the discontinuity of one of the multiple of layers defines a width WD. A ratio WD/WM is defined between 0.575-0.66.

In a further embodiment of any of the foregoing embodiments of the present disclosure, the width WM of the main body is exclusive of a multiple of tabs.

In a further embodiment of any of the foregoing embodiments of the present disclosure, the material charge includes a multiple of layers. At least one of the multiple of layer includes a discontinuity.

In a further embodiment of any of the foregoing embodiments of the present disclosure, the material charge is of a sheet molding compound material.

In a further embodiment of any of the foregoing embodiments of the present disclosure, the material charge is carbon fiber based.

In a further embodiment of any of the foregoing embodiments of the present disclosure, the material charge is Lytex 4149.

A liner panel for a gas turbine engine, according to another disclosed non-limiting embodiment of the present disclosure, includes a forward fan exit case liner panel with a donor bushing from a damaged forward fan exit case liner panel.

In a further embodiment of any of the foregoing embodiments of the present disclosure, the forward fan exit case liner panel includes a multiple of bushings. The donor bushing is metallic.

In a further embodiment of any of the foregoing embodiments of the present disclosure, at least one of the multiple of bushings is non-metallic.

In a further embodiment of any of the foregoing embodiments of the present disclosure, the forward fan exit case liner panel is molded from a material charge that includes a multiple of layers. At least one of the multiple of layer includes a discontinuity.

In a further embodiment of any of the foregoing embodiments of the present disclosure, a main body of one of the multiple of layers defines a width WM and the discontinuity of one of the multiple of layers defines a width WD. A ratio WD/WM is defined between 0.575-0.66. The width WM of the main body is exclusive of a multiple of tabs.

In a further embodiment of any of the foregoing embodiments of the present disclosure, the multiple of layers are each of Lytex 4149.

A liner panel for a gas turbine engine, according to another disclosed non-limiting embodiment of the present disclosure, includes a forward fan exit case liner panel molded from a material charge that includes a multiple of layers. At least one of the multiple of layer includes a discontinuity.

In a further embodiment of any of the foregoing embodiments of the present disclosure, a main body of one of the multiple of layers defines a width WM and the discontinuity of one of the multiple of layers defines a width WD. A ratio WD/WM is defined between 0.575-0.66. The width WM of the main body is exclusive of a multiple of tabs.

In a further embodiment of any of the foregoing embodiments of the present disclosure, the material charge is Lytex 4149.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
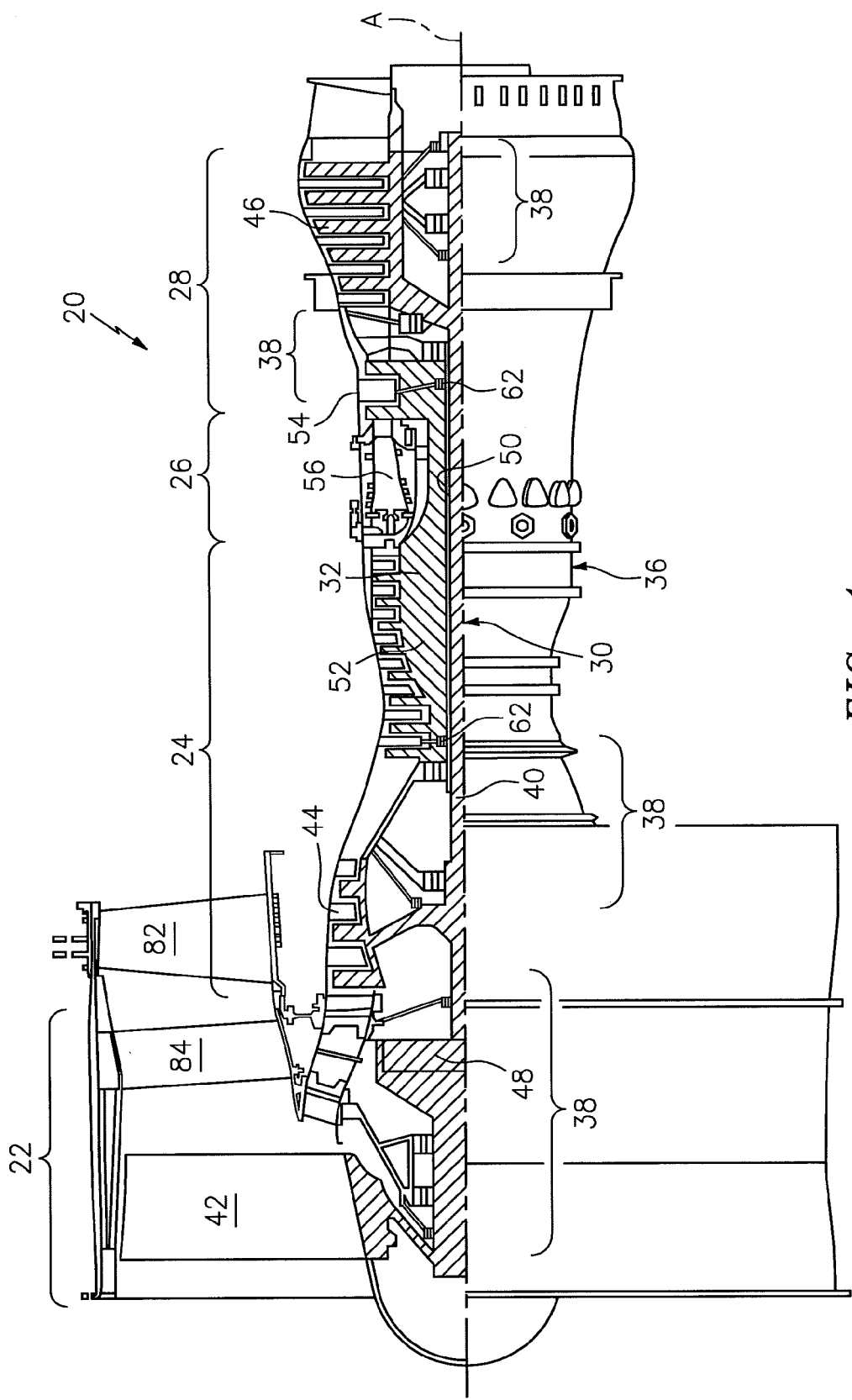
FIG. 1 is a schematic cross-section of an example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines (not shown) might include an augmentor section among other systems or features. Although depicted as a high-bypass turbofan in the disclosed non-limiting embodiment, it should be appreciated that the concepts described herein are not limited to use only with turbofan architectures as the teachings may be applied to other types of turbine engines such as turbojets, turboshafts, industrial gas turbines, and three-spool (plus fan) turbofans with an intermediate spool.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and high spool 32 in response to the expansion.

Figure 2:
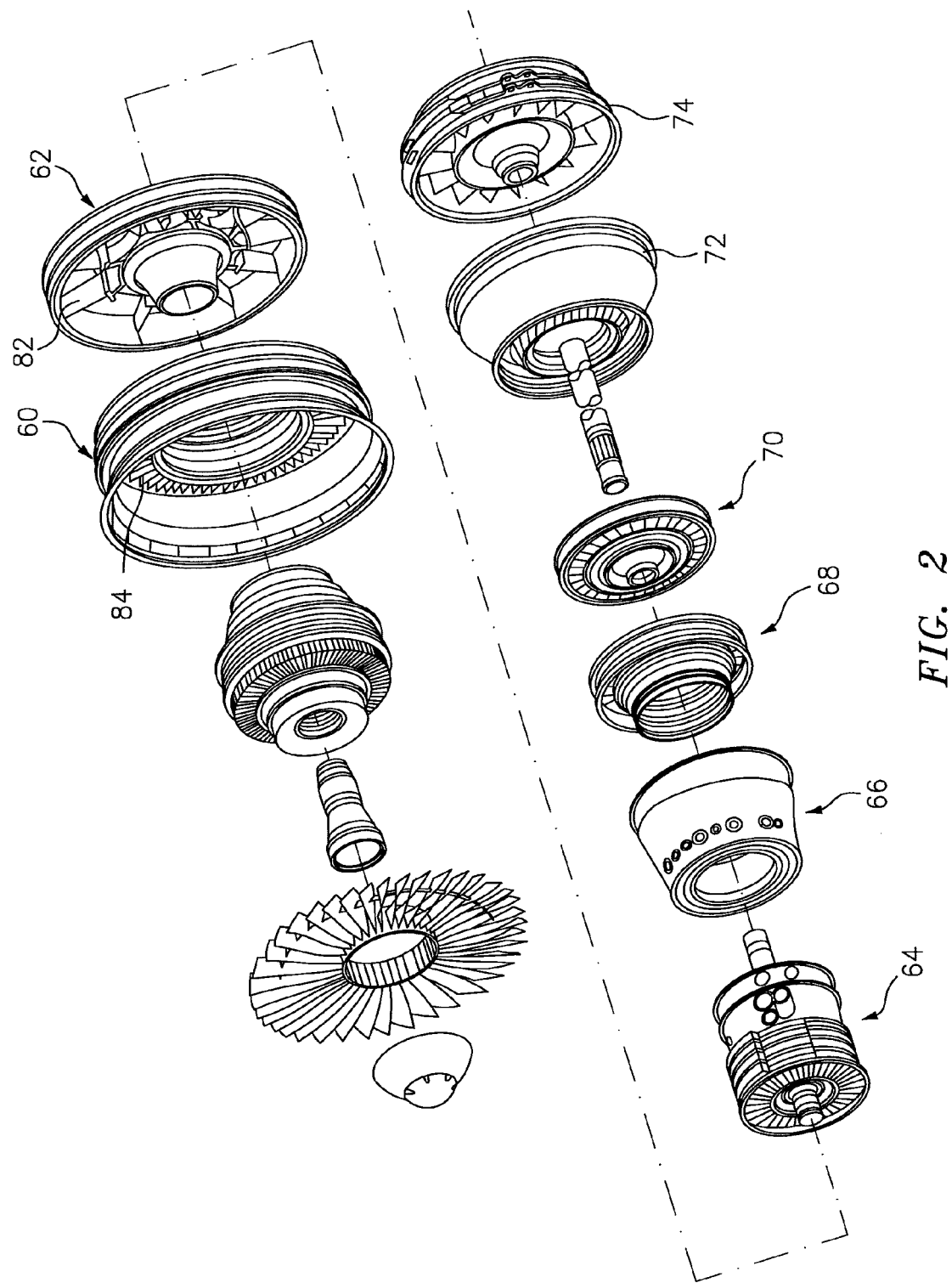
FIG. 2 is an expanded perspective partial schematic view of gas turbine engine illustrating a liner panel assembly location within the fan section.

With reference to FIG. 2, the engine case structure 36 generally includes an assembly of a multiple of cases or modules to include a fan case 60, an intermediate case 62, a HPC case 64, a diffuser case 66, a High Pressure Turbine (HPT) case 68, a mid turbine frame (MTF) case 70, a Low Pressure Turbine (LPT) case 72, and a Turbine Exhaust case (TEC) 74. It should be appreciated that various additional or alternative cases will also benefit herefrom and the cases 60-74 may be assembled or disassembled for maintenance at any interface.

Figure 3:
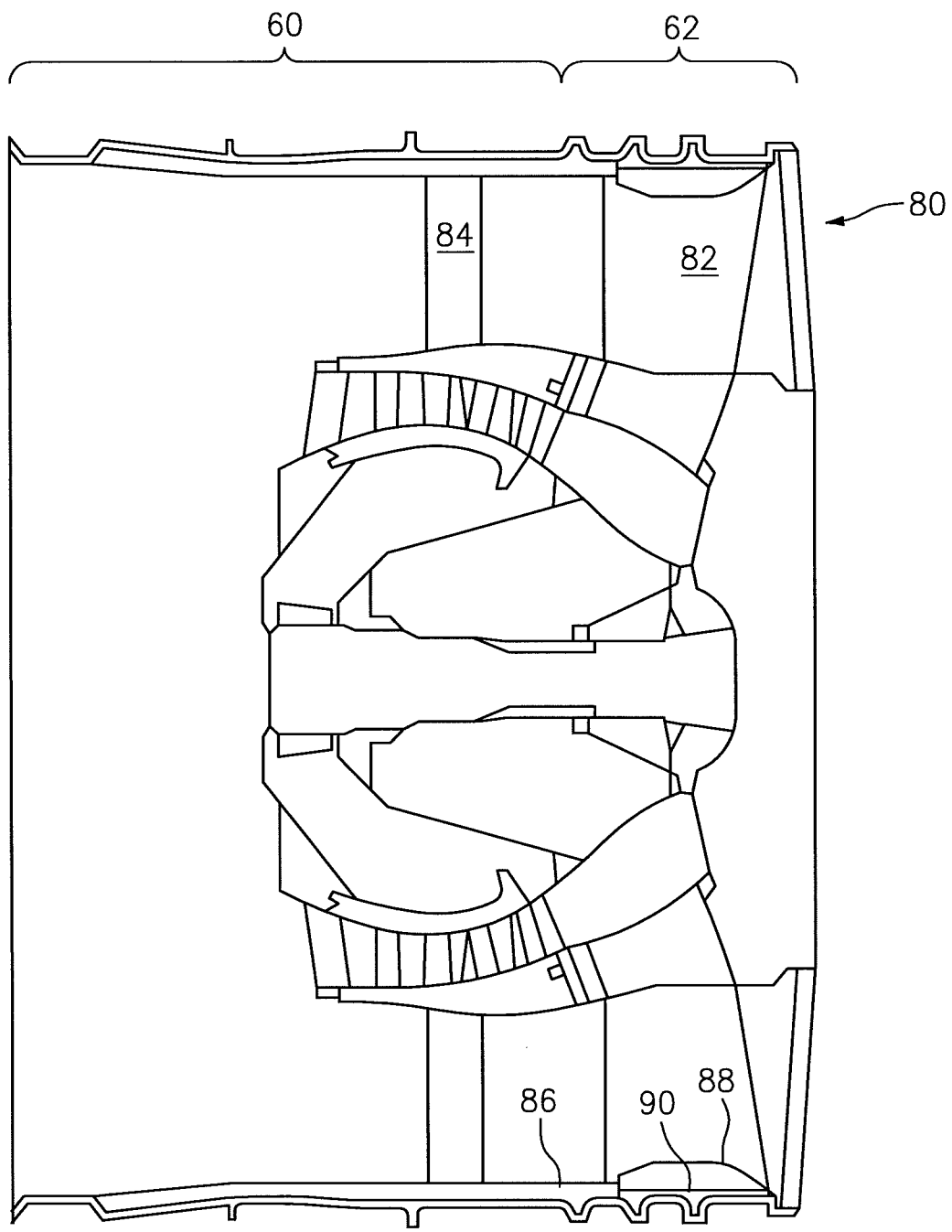
FIG. 3 is a sectional view of the fan section.
Figure 4:
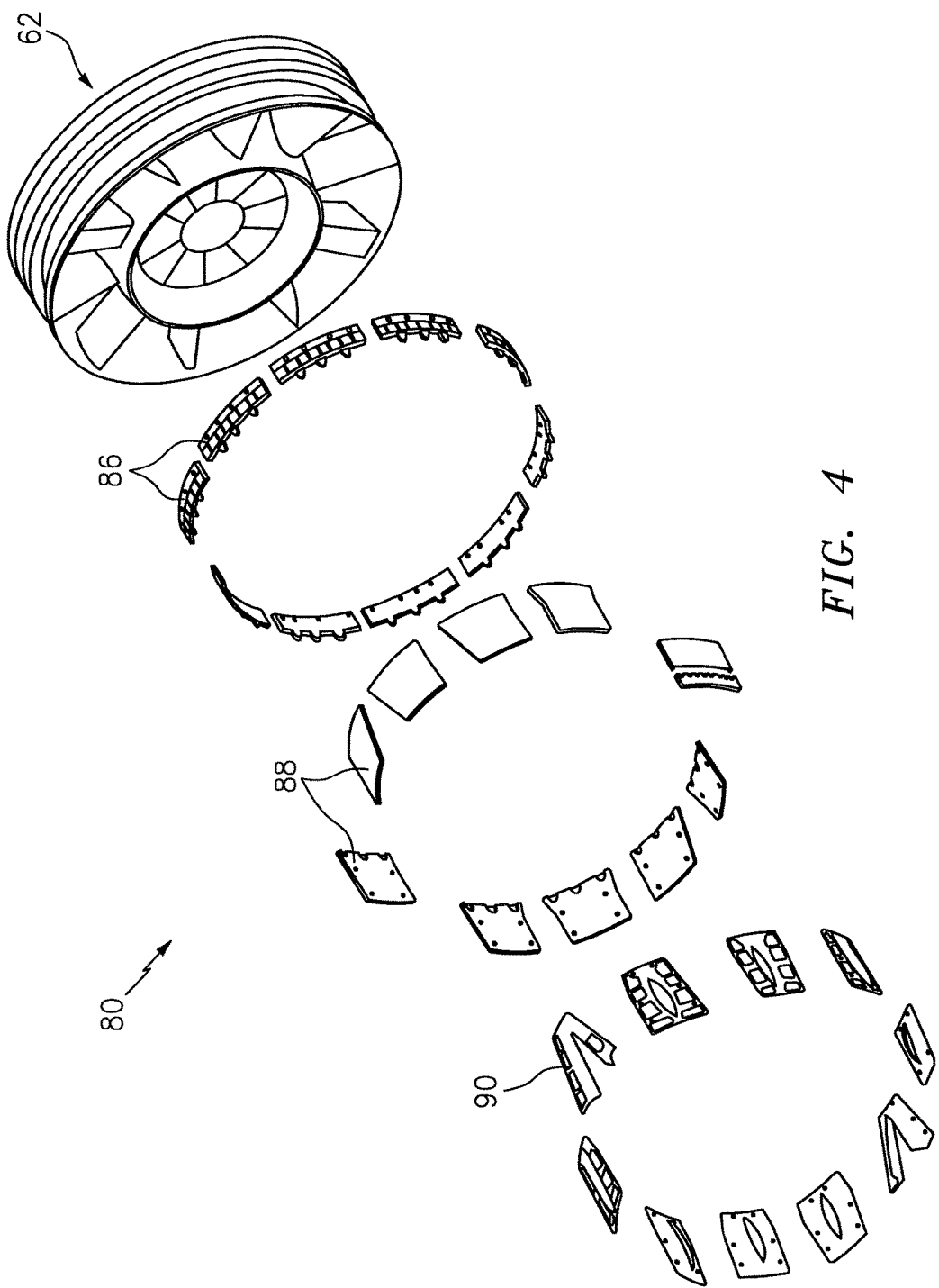
FIG. 4 is an exploded view of the liner panel assembly within the fan section.

With reference to FIG. 3, the fan case 60 and intermediate case 62 are shown by way of example; however, other engine case sections and liner panels will also benefit herefrom. The intermediate case 60 generally includes a liner panel assembly 80 (also shown in FIG. 4) removably mounted to a fan case structure 82 to provide a removable gas path surface that facilitates airflow through the fan case 60 and around a multiple of structural support vanes 82 and a multiple of exit guide vanes 84 forward thereof.

The liner panel assembly 80 shown by way of example includes a multiple of forward fan exit case liner panels 86 (also often known as Ice Panels and A/O Panels), a multiple of aft fan exit case liner panels 88 and a multiple of seal panels 90. Although the forward fan exit case liner panels 86 are utilized hereafter as the example component for a method of repair, remanufacture or original manufacture, it should be appreciated that various panels will also benefit herefrom.

Figure 5:
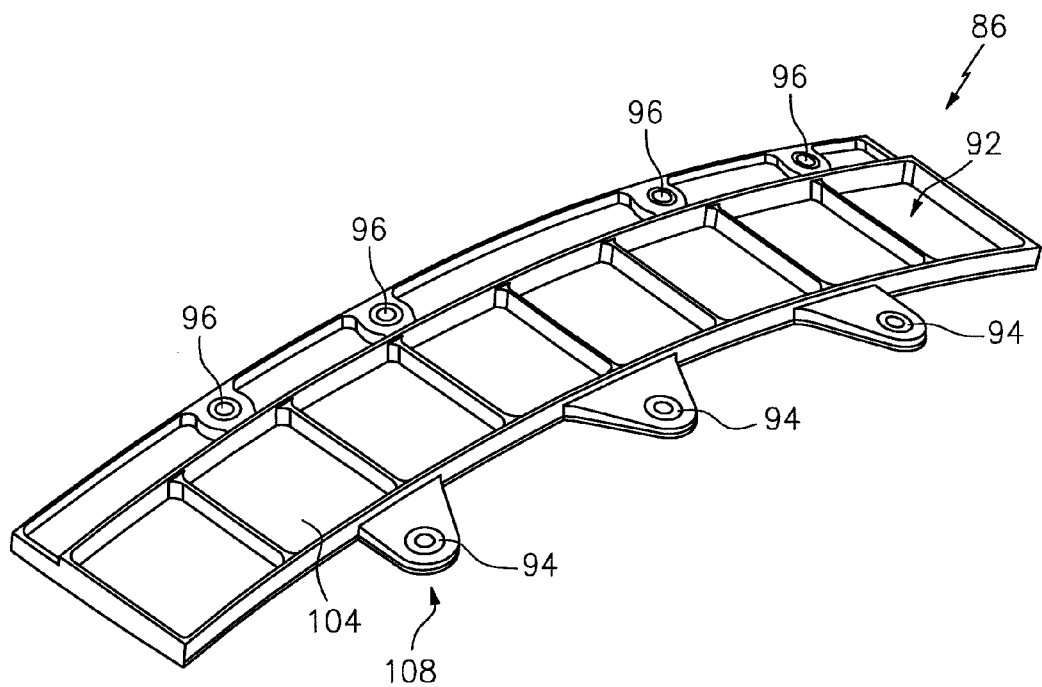
FIG. 5 is a ribbed non-gas path side of an example forward liner panel.
Figure 6:
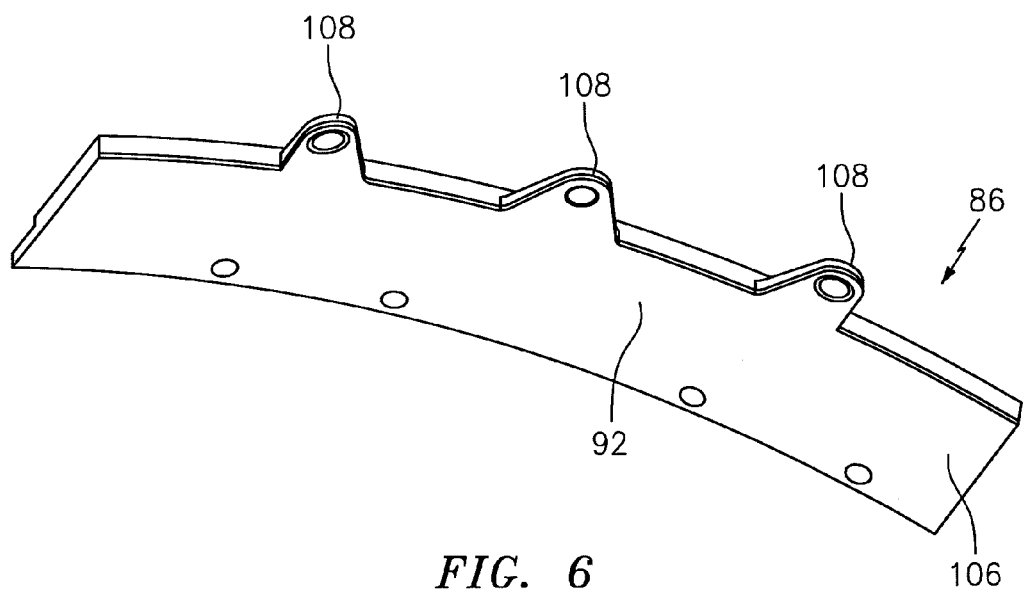
FIG. 6 is a gas path side of the example forward liner panel of FIG. 5.

With reference to FIGS. 5 and 6, each of the example forward fan exit case liner panels 86 are formed of a non-metallic material body 92 with a multiple of metallic bushings 94 (three show) and a multiple of non-metallic bushings 96 (four shown) molded therein. Over time, the non-metallic material body 92 may become worn or damaged because of, for example, vibrations caused by engine operation.

Figure 7:
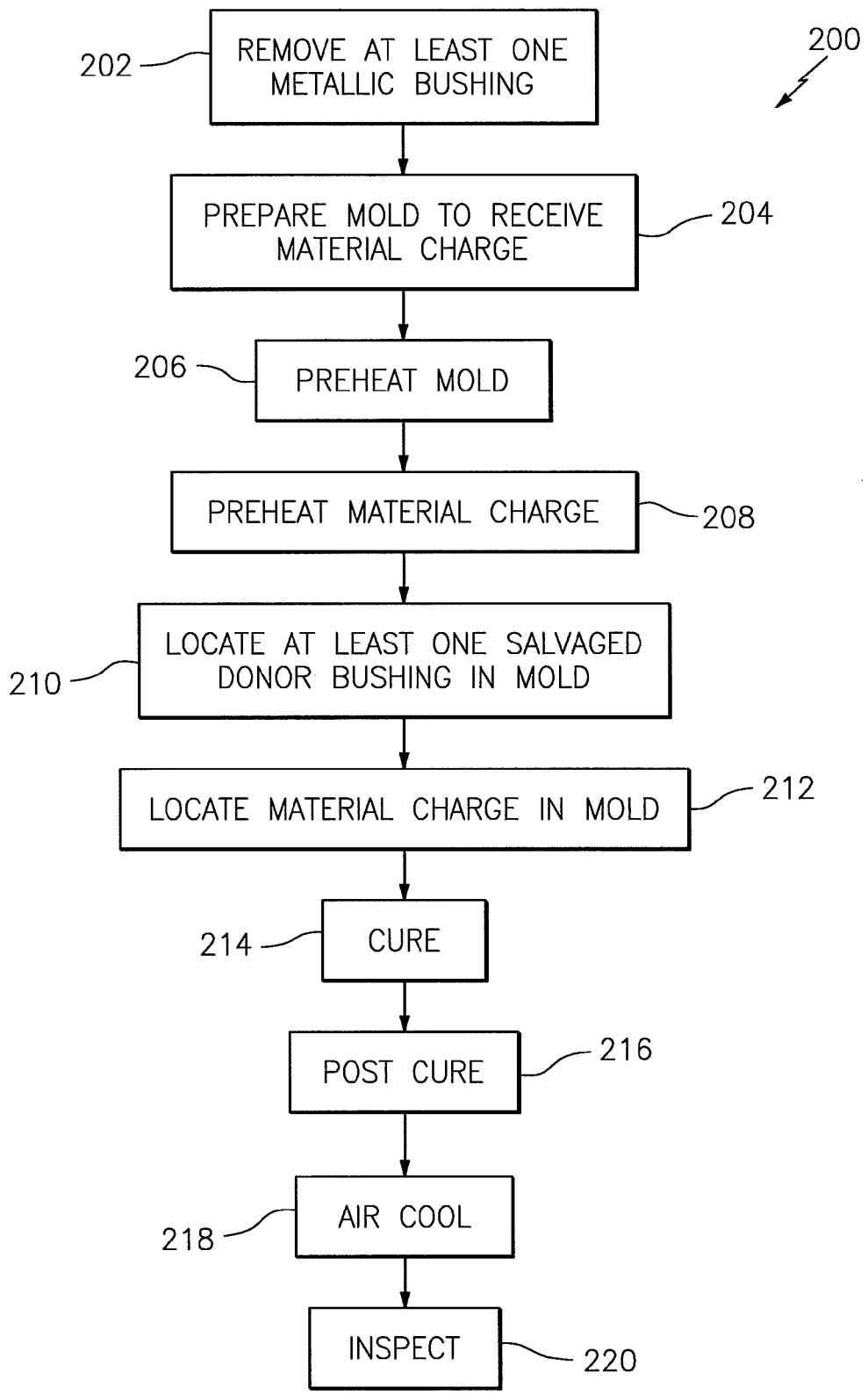
FIG. 7 is a flow chart diagram of a method to repair or remanufacture a liner panel.

With reference to FIG. 7, a method 200 of repair, remanufacture or original manufacture for the example forward fan exit case liner panel 86 (see FIGS. 5 and 6) according to one disclosed non-limiting embodiment initially includes removal of the metallic bushings 94 from a damaged non-metallic material body 92 (step 202). That is, at least one of the metallic bushings 94 is preserved as a donor bushing for remanufacture from a damaged forward fan exit case liner panel 86 that may be non-serviceable. That is, the donor bushing is that which was salvaged. The metallic bushings 94 may be removed by, for example, plastic media blasting at up to 70 psi.

Next, a fabrication mold 100A, 100B (illustrated schematically; see FIG. 8) is prepared to receive a material charge 102 (step 204). The fabrication mold 100 may be preheated to about 315° F. (about 157° C.) maximum (step 206). The material charge 102 may also be preheated at about 200° F. (about 93° C.) maximum for up to twelve (12) minutes maximum (step 208). The fabrication mold 100 is shaped to form the non-metallic material body 92 of the forward fan exit case liner panels 86 that generally includes a ribbed side 104 (see FIG. 5), a smooth gas path side 106 (see FIG. 6), and a multiple of tabs 108 (see FIGS. 5 and 6). It should be appreciated that various components and structures therefor will also benefit herefrom.

Next, at least one salvaged donor metallic bushing 94D as well as new metallic bushings 94A and new non-metallic bushings 96A are positioned—typically on pins—in the fabrication mold 100B (see FIG. 8) that has been prepared to receive the material charge 102 (step 210). Prepared as defined herein includes, at least, that mold release is dried (and cured, if applicable) on fabrication mold 100 before installation of the bushings 94D, 94A, 96A. In another disclosed non-limiting embodiment, all the bushings 94, 96 are new manufacture.

Figure 8:
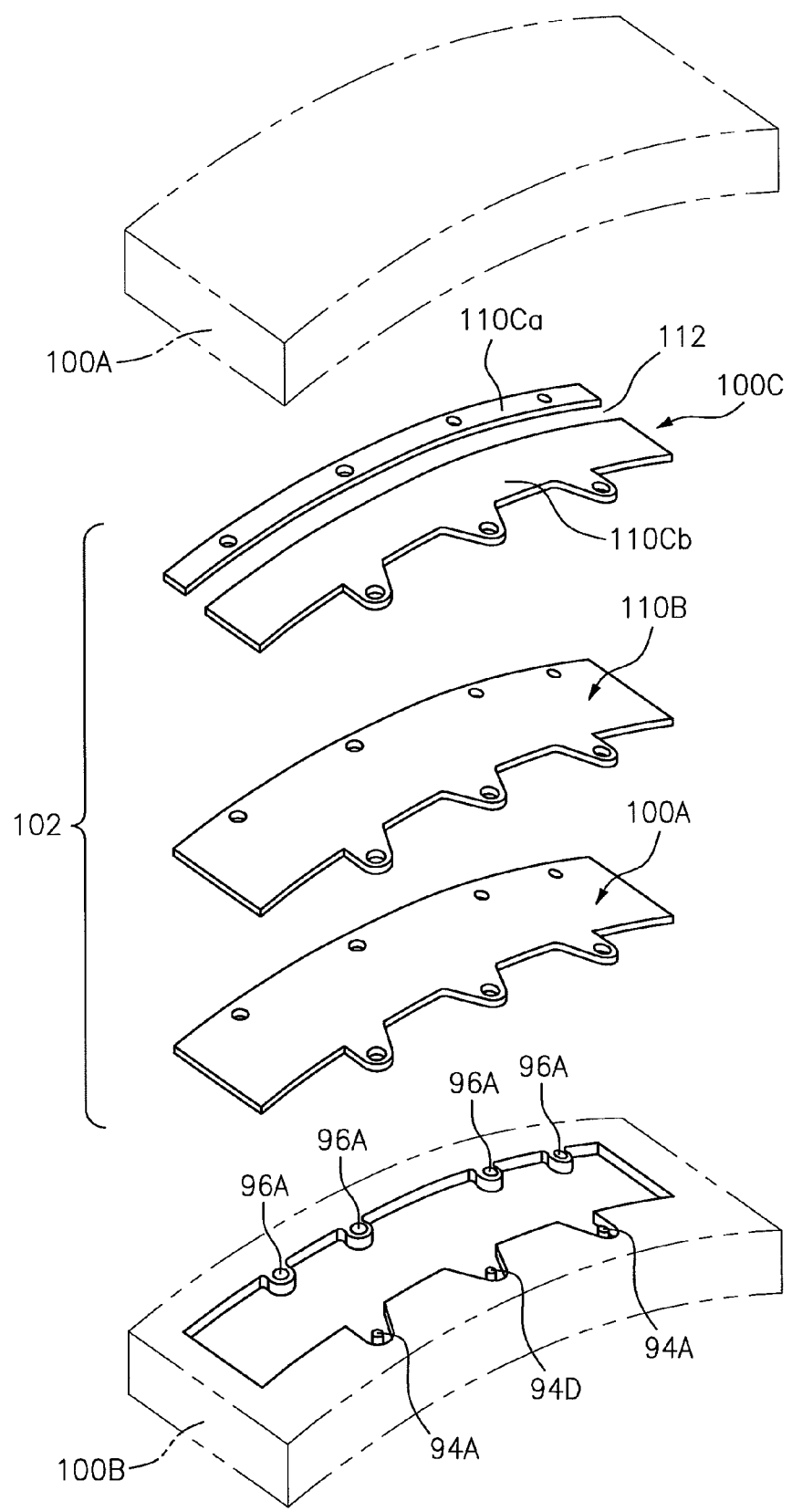
FIG. 8 is an exploded view of a material charge and mold for the liner panel assembly.

The material charge 102 is prepared from a multiple of layers 110A, 110B, 110C (three shown; see FIG. 8). The material of each of the layers 110A, 110B, 110C in this disclosed non-limiting embodiment is a carbon fiber based sheet molding compound material such as Lytex 4149 supplied by Quantum Composites Inc. of Bay City, Mich. USA. Lytex 4149 is a high-performance, 3 K tow carbon fiber (PAN) reinforced epoxy sheet molding compound designed for military and aerospace structural applications with excellent mechanical properties, retention of properties at elevated temperatures, good chemical resistance, and low density.

The material charge 102 may be prepared in a clean shop area in which, for example, ambient humidity and contamination risks are mitigated to prevent conditions adverse to molding.

Figure 9:
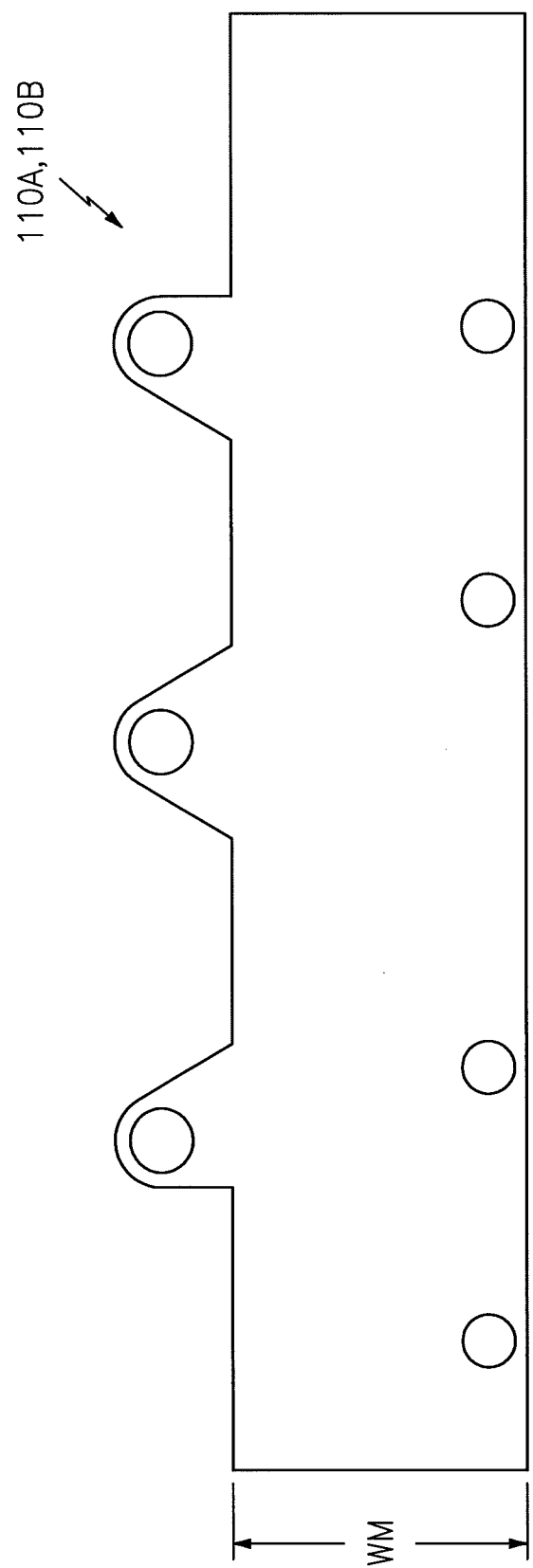
FIG. 9 is a plan view of one layer of the material charge for the liner panel assembly.
Figure 10:
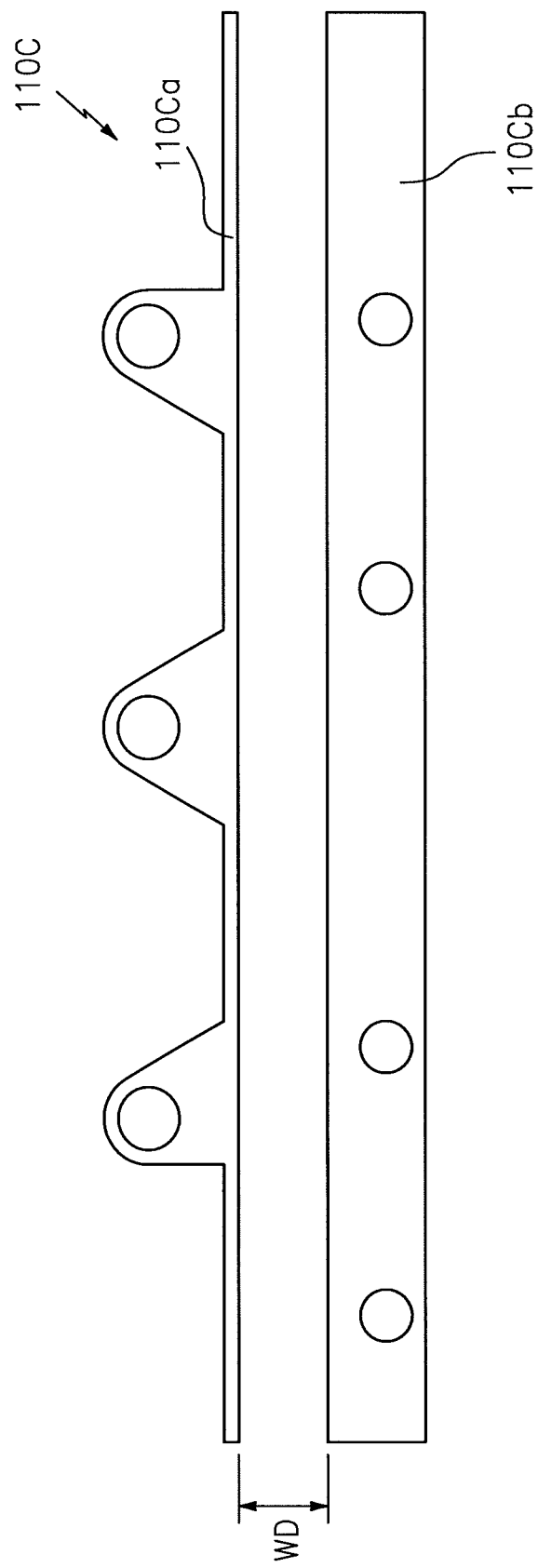
FIG. 10 is a plan view of one layer with a discontinuity of the material charge for the liner panel assembly.

The material charge 102 is then located in the mold 100B (step 212). Layer 110A is positioned along the gas path side and is essentially identical to layer 110B. Layer 110C is discontinuous. That is, layer 110C is actually two portions 110Ca, 110Cb with the discontinuity 112 generally along a length thereof. A width WM of the main body of the Layers 110A, 110B, and 110C (FIG. 9) exclusive of the tabs 108. A width WD of the discontinuity 112 of the layer 110C (FIG. 10). In this disclosed non-limiting dimensional embodiment, a ratio of WD/WM is defined between 0.575-0.66. The disclosed ratios facilitate flow of the sheet molding compound into the circumferential ribs, and raised boss structure of the fabrication mold 100A and 100B.

The material charge 102 is then cured in the fabrication mold 100A and 100B at to form the example forward fan exit case liner panels 86 (step 214). The forward fan exit case liner panel 86 is then post-cured (step 216) then air cooled to room temperature (step 218).

Finally, the forward fan exit case liner panel 86 may be inspected (step 220).

The method and charge pattern result in relatively higher vibration resistance and optimal strength. The improved strength components provide a relatively longer service life.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of remanufacturing a liner panel for a gas turbine engine, comprising:
    removing a bushing from a damaged component; and
    molding the bushing with a material charge;
    wherein the material charge includes a multiple of layers, and at least one of the multiple of layers incudes a discontinuity; and
    wherein a main body of one of the multiple of layers defines a width (WM) and the discontinuity of one of the multiple of layers defines a width (WD), and wherein a ratio WD/WM is defined between 0.575-0.66.

2. The method as recited in claim 1, wherein the width WM of the main body is exclusive of a multiple of tabs.

3. A liner panel for a gas turbine engine, comprising:
    a forward fan exit case liner panel with a donor bushing from a damaged forward fan exit case liner panel;
    wherein the forward fan exit case liner panel is molded from a material charge that includes a multiple of layers, and at least one of the multiple of layers includes a discontinuity; and
    wherein a main body of one of the multiple of layers defines a width (WM) and the discontinuity of one of the multiple of layers defines a width (WD), a ratio WD/WM is defined between 0.575-0.66, and the width WM of the main body is exclusive of a multiple of tabs.

4. The liner panel as recited in claim 3, wherein the forward fan exit case liner panel includes a multiple of bushings, and the donor bushing is metallic.

5. The liner panel as recited in claim 4, wherein at least one of the multiple of bushings is non-metallic.

6. The liner panel as recited in claim 3, wherein the multiple of layers are each carbon fiber based.

7. A liner panel for a gas turbine engine, comprising:
    a forward fan exit case liner panel molded from a material charge that includes a multiple of layers, wherein at least one of the multiple of layer includes a discontinuity; and
    wherein a main body of one of the multiple of layers defines a width (WM) and the discontinuity of one of the multiple of layers defines a width (WD), a ratio WD/WM is defined between 0.575-0.66, and the width WM of the main body is exclusive of a multiple of tabs.

8. The liner panel as recited in claim 7, wherein the material charge is carbon fiber based.

* * * * *